United States Patent [19]

Takenaka et al.

[11] Patent Number: 4,921,260
[45] Date of Patent: May 1, 1990

[54] LIP SEAL DEVICE FOR WATER PUMPS

[75] Inventors: Akira Takenaka; Masanori Hatanaka, both of Toyota, Japan

[73] Assignee: Taiho Kogyo Co.

[21] Appl. No.: 209,811

[22] Filed: Jun. 22, 1988

[30] Foreign Application Priority Data

Jun. 24, 1987 [JP] Japan .................. 62-157157

[51] Int. Cl.$^5$ .............................................. F16J 15/32
[52] U.S. Cl. ................................. 277/153; 277/208; 277/235 R
[58] Field of Search .................. 277/152, 153, 235 A, 277/235 R, 236, 208, 1

[56] References Cited

U.S. PATENT DOCUMENTS

| | | |
|---|---|---|
| 2,172,325 | 9/1939 | Victor et al. . |
| 2,478,140 | 8/1949 | Ulseth . |
| 3,011,814 | 12/1961 | Rhoads et al. ..................... 277/153 |
| 3,099,454 | 7/1963 | Walinski . |
| 3,207,521 | 9/1965 | Dega ................................. 277/208 |
| 3,214,180 | 10/1965 | Hudson et al. ..................... 277/153 |
| 3,275,331 | 9/1966 | Mastrobattista et al. ............. 277/1 |
| 3,917,286 | 11/1975 | Loyd ................................. 277/153 |
| 4,427,205 | 1/1984 | Hölzer et al. . |
| 4,721,314 | 1/1988 | Kanayama et al. . |
| 4,733,873 | 3/1988 | Takenaka et al. . |

FOREIGN PATENT DOCUMENTS 1038019  8/1966  United Kingdom ............... 277/153

*Primary Examiner*—Robert S. Ward

[57] ABSTRACT

A lip seal device for use with an automobile water pump having a simple structure and which can be manufactured with a compact size and at a low cost. The lip seal device includes a housing, a rotary shaft rotatably supported in the housing, a case through which the rotary shaft passes, a sleeve fixed to the rotary shaft, and a sealing member formed of two sheets of lips, the outer end portions of which are attained to the case and the inner end portions of which are in sliding contact with the outside circumferential surface of the sleeve, whereby the generation of abnormal noise in the automobile engine is effectively controlled.

12 Claims, 3 Drawing Sheets

LIP SEAL DEVICE FOR WATER PUMPS

BACKGROUND OF THE INVENTION

The present invention relates to a lip seal device for water pumps.

Heretofore, for sealing the water pump of an automobile, a mechanical seal device has been used. Generally, such devices include a follower ring slidably and axially provided within a case attached to a housing, and a sealing plate mounted on a rotary shaft passing through the shaft of the follower ring with the follower ring being brought into sliding contact with the sealing plate due to the elastic force of a coil spring, whereby the engine coolant is kept liquid-tight by the sealing surface between these members. An example of such a mechanical seal is shown in commonly assigned U.S. Pat. No. 4,733,873.

However, the mechanical seal device of the above structure has disadvantages in that since the follower ring is supported by the coil spring, it has a wide range of freedom of movement so that it can easily frictionally vibrate. Once the follower ring has begun to vibrate, the coil spring also vibrates in resonance therewith, resulting in transmitting an amplified vibration to all parts of the automobile engine. This phenomenon is especially bothersome when the engine is at idle or rotating at a low speed, that is, when the engine noise level is low. During such times, an abnormal "creaking" sound is liable to be heard.

Further disadvantages of the mechanical seal device are that since the follower ring is slidably mounted in the case so as to come into sliding contact with the sealing plate due to the elastic force of the coil spring, not only is the overall seal device unavoidably large, but also the structure thereof is complicated and expensive.

Further, a lip-type seal device is known for use in sealing an automotive compressor which uses no coil spring. An example of such a lip-type seal device is described in commonly assigned U.S. Pat. No. 4,721,314. However, such seal devices have not previously been used for sealing water pumps. That is, in a compressor, the liquid for which the seal is provided is a type of oil, which provides a much better lubricating effect for the seal than can water in the case of a water pump. If such a lip seal for a compressor were used in a water pump, leakage would unavoidably occur.

SUMMARY OF THE INVENTION

The present invention has been made to eliminate the above-described disadvantages of the conventional mechanical seal device, and a principal object of the invention is to provide a lip seal device for use with an automobile water pump which can effectively prevent the generation of abnormal sounds yet which provides a good sealing effect.

The lip seal device according to the present invention comprises a rotary shaft rotatably supported in a housing, a case mounted in the housing and having an axial section through which the rotary shaft passes so as to freely rotate and at least one lip having its outside circumferential surface attached to the case and its inner circumferential surface held in sliding contact with a sleeve disposed around the outside circumferential surface of the rotary shaft.

The lip seal device of the present invention having the above-described structure attains substantially the same level of efficiency as the conventional mechanical seal device but, due the absence of any resonant part such as the coil spring of the conventional seal device, prevents the generation of abnormal noise while providing a good sealing effect. Further, since the structure thereof is simple, it can be manufactured with a compact size and at a low cost.

DESCRIPTION OF THE PREFERRED EMBODIMENTS

The present invention will now be described on the basis of first and second preferred embodiments thereof and with reference to the accompanying drawings.

Figure 1:
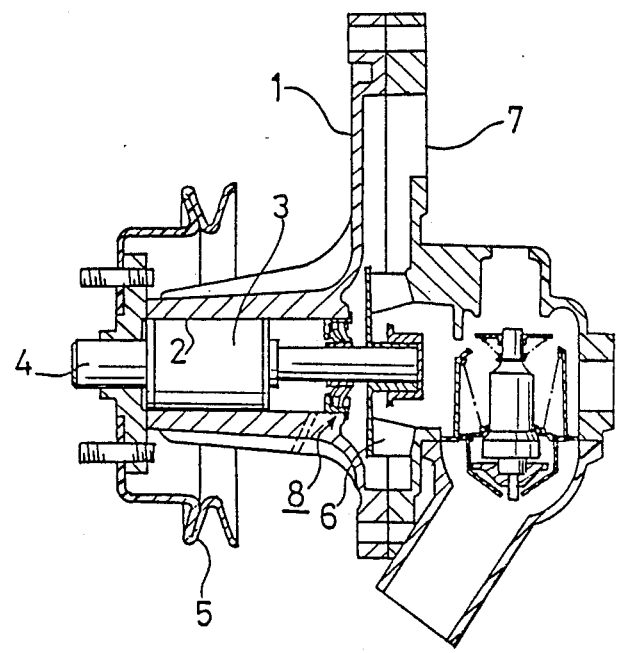
FIG. 1 is a cross-sectional view of a water pump employing a lip seal device constructed according to a first embodiment of the invention.
Figure 2:
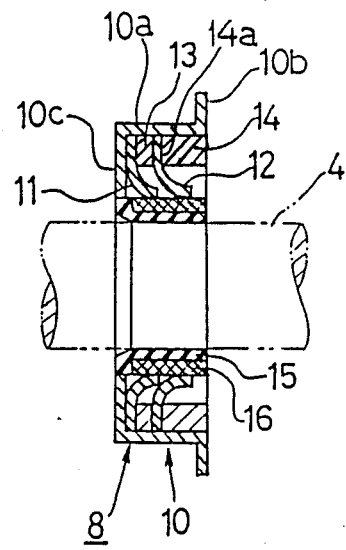
FIG. 2 is an enlarged cross-sectional view of the lip seal device of the first embodiment.

The first embodiment of the present invention is shown in FIGS. 1 and 2. Referring to FIG. 1, a rotary shaft 4 is rotatably supported in a throughhole 2 formed in a water pump housing 1 through a bearing 3, and a pulley 5 is mounted on one end of the rotary shaft 1 projecting outside the housing 1 and interlocked with an engine crankshaft (not shown).

On the other end of the rotary shaft 4 located within the housing 1 there is mounted a rotor 6 for feeding liquid coolant, and at a portion between the rotor 6 and the bearing 3 in the throughhole 3 there is provided a seal lip device 8 for sealing a coolant passage 7.

As shown on a enlarged scale in FIG. 2, the seal lip device 8 includes a cylindrical case 10 fixed to the housing 1 and two sheets of seal lips 11 and 12 made of polytetrafluoroethylene (PTFE) disposed in the case 10. The case 10 includes a cylindrical main body 10a, a flange 10b extending radially and outwardly from the right end portion of the main body 10a, and a flange 10c extending radially and inwardly from the left end portion of the main body 10a.

The case 10 is fixed to the housing 1 in such a manner that it is press-fitted into the throughhole 2 until the flange 10b extending outwardly in the radial direction comes into contact with the inner wall of the housing 1.

Figure 3:
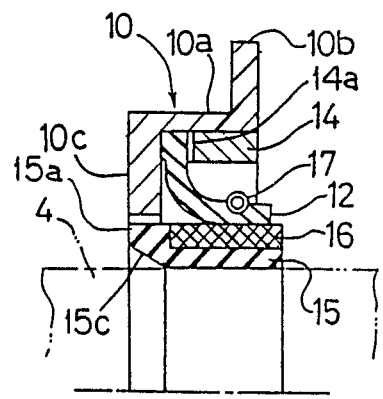
FIG. 3 is a cross-sectional view of a portion of a lip seal device of a second embodiment of the invention.

The two seal lips 11 and 12 received within the cylindrical main body 10a of the case 10 are arranged such that the outside circumference of the lip 11 is held in contact with the flange 10c. A spacer 13 is inserted midway between the outside circumferences of the lips 11 and 12 and the lip 12 is supported by a spacer 14 press-fitted and fixed within the main body 10a of the case 10 so that the lip 11, spacer 13 and lip 12 are integrally fixed between the flange 10c and the spacer 14. As shown in FIGS. 2 and 3, spacer 14 has a flat side face 14a which faces the flange 10c. The flat side face has a radial thickness which is smaller than the radial thickness of the flange 10c and which is larger than the radial thickness of the main body 10a of the case 10. Further, the flat side face 14a has a radial thickness which is smaller than the axial width of the spacer 14.

Further, as shown in FIG. 2, the rotary shaft 4 passes through the case 10 in the axial direction so as to rotate freely, and a sleeve 16 made of a material having excellent antiabrasive and anticorrosive properties is fixed to the outside circumference of the rotary shaft 4 at the portion at which the rotary shaft 4 passes through the case 10 through a rubber seal member 15. For the material of the sleeve 16, it is preferred to employ a ceramic material, such as alumina or titanium carbide, or a metallic material, such as stainless steel, steel having a chrome plating, or a copper alloy, for example, a copper-tin alloy. In addition, a portion of the inner circumferential surface of each of the lips 11 and 12 is curved toward the coolant side from the radial direction, that is, toward the right in the axial direction, so that a portion of each lip is held in sliding contact with the outside circumferential surface of the sleeve 16 by its own elastic force.

With the above arrangement, since each of the lips 11 and 12 is in close contact with the sleeve 16 fixed to the rotary shaft 4 due to its own elastic force when the engine (not shown) is not running, the coolant in the passage 7 is prevented form leaking outside.

Further, when the engine is started, the rotary shaft 4 is driven to rotate through the pulley 5 to cause the rotor 6 to rotate therewith, the coolant in the passage 7 is supplied to all required parts of the engine. In this case, the lips 11 and 12 slide against the sleeve 16, but, even when the rotary shaft 4 is rotating, they constantly serve to prevent the coolant from leaking to the outside.

Thus, unlike the conventional mechanical seal devices, the lip seal device 8 of the above-described embodiment does not include a resonant member such as a coil spring, and therefore the generation of abnormal noise is prevented. Further, the device of the invention can be manufactured with a compact size and at low cost since the number of parts and the number of manufacturing steps are minimized.

A second embodiment of the present invention is shown in FIG. 3. As will be seen from this figure, the lip seal device of this embodiment is provided on the sliding outside circumferential surface with a spring 17 surrounding the rotary shaft 4 in lieu of the seal lip 11 and the spacer 13 of the first embodiment. The remaining parts are the same as those of the first embodiment, and the same operation and effects as those of the first embodiment can be attained by this embodiment. A single flange portion 15A is provided on the seal member 15 to prevent movement of the sleeve 16. The flange portion has a beveled portion 15C disposed at an inner circumferential surface of the seal member 15. As shown in FIG. 3, the length of the inner surface of the cylindrical portion of seal member 15 is greater than that of the sleeve 16.

Figure 4:
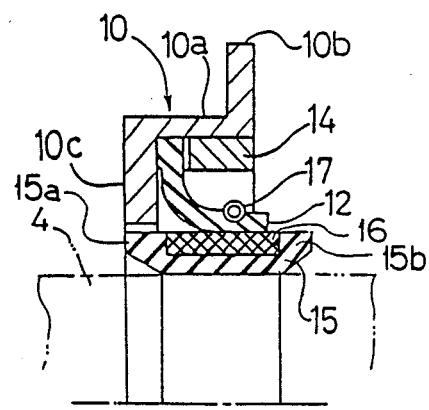
FIG. 4 is a cross-sectional view of a portion of a lip seal device of a third embodiment of the invention.

In a third embodiment of the invention as shown in FIG. 4, the rubber seal member 15 is provided with two flange portions 15A and 15B, rather than the single flange portion 15A employed in the above-described embodiments. Although it is not absolutely to provide even the single flange portion, use of a flange portion is useful in that it prevents movement of the sleeve against pressure. The provision of two flange portions enhances this effect.

As described above, according to the lip seal device of the present invention, the generation of abnormal noise is prevented due to the elimination of a coil spring or the like. Moreover, the inventive lip seal device can be manufactured with a compact size, and, since it is not necessary to employ a rotary shaft having a precisely controlled diameter due to the use of the sleeve, the lip seal device of the invention can be produced at a low cost.

What is claimed is:

1. A lip seal device for an automobile water pump comprising: a rotary shaft rotatably supported within a housing; a case fixed to said housing and having a cylindrical main body, a first flange extending radially and outwardly of one end portion of said main body so as to engage with an inner wall of said housing which faces a pump chamber of said water pump and a second flange extending radially and inwardly of the other end portion of said main body, said rotary shaft rotatably passing through an axial section of said case; a sleeve fixed to said rotary shaft; and at least one seal lip whose outside circumferential surface is held in contact with said second flange and said main body of said case and having an inner circumferential surface which is in sliding contact with an outside circumferential surface of said sleeve.

2. The lip seal device according to claim 1, wherein said sleeve is made of a material selected from the group consisting of alumina, titanium carbide, stainless steel, chrome-plated steel, and copper alloy.

3. The lip seal device according to claim 2, wherein said copper alloy is an alloy of copper and tin.

4. The lip seal device according to claim 1, further comprising a rubber seal member for fixing said sleeve to said rotary shaft.

5. The lip seal device according to claim 4, wherein said rubber seal member has one flange portion extending radially outward around a respective end portion of said sleeve.

6. The lip seal device according to claim 4, wherein said rubber seal member has two flange portions extending radially outward around respective end portions of said sleeve.

7. The lip seal device according to claim 1, wherein a pair of lip seals are provided.

8. The lip seal device according to claim 7, further comprising a spacer disposed between said pair of lip seals.

9. The lip seal device according to claim 1, wherein a single lip seal is provided, and further comprising spring means surrounding said single lip seal for urging said lip seal into contact with said outside circumferential surface of said sleeve.

10. A lip seal device for an automobile water pump comprising: a rotary shaft rotatably supported within a housing; a case, said rotary shaft rotatably passing through an axial section of said case; a sleeve fixed to said rotary shaft; and a pair of lip seals whose outside circumferential surfaces are attached to said case and each of whose inner circumferential surface is in sliding contact with an outside circumferential surface of said sleeve, wherein a portion of said inner circumferential surface of each of said lip seals is curved toward a pump chamber of said water pump.

11. A lip seal device for an automobile water pump comprising: a rotary shaft rotatably supported within a housing; a case, said rotary shaft rotatably passing through an axial section of said case; a sleeve fixed to said rotary shaft; and at least one seal lip whose outside circumferential surface is attached to said case and having an inner circumferential surface which is in sliding contact with an outside circumferential surface of said sleeve; further comprising an elastic seal member for fixing said sleeve to said rotary shaft, said elastic seal member including one flange portion extending radially outward around a respective end portion of said sleeve, said flange portion having a beveled portion disposed at an inner circumferential surface of said elastic seal member and extending axially outward beyond a respective end portion of said sleeve, said elastic seal member further having a cylindrical body for fixing said sleeve to said rotary shaft, wherein the length of an inner surface of said cylindrical body is greater than that of said sleeve.

12. A lip seal device for an automobile water pump comprising: a rotary shaft rotatably supported within a housing; a case fixed to said housing and having a cylindrical main body and a flange extending radially and inwardly of an end portion of said main body, said rotary shaft rotatably passing through an axial section of said case; a sleeve fixed to said rotary shaft; and at least one seal lip whose outside circumferential surface is attached to said case and having an inner circumferential surface which is in sliding contact with an outside circumferential surface of said sleeve; further comprising a cylindrical outer spacer having a flat side face, said flat side face having a radial thickness which is smaller than the radial thickness of said flange and is larger than the radial thickness of said main body and further is smaller than the axial width of said outer spacer; wherein the outside circumferential surface of said seal lip is held in contact with said flat side face of said outer spacer and with said flange; and further wherein a portion of said inner circumferential surface of said seal lip is curved from an inner circumferential surface of said flat side face toward the opposite side of said outer spacer.

* * * * *